H. S. DILLS.
FISH BAIT.
APPLICATION FILED DEC. 18, 1915.
1,352,054.                                                    Patented Sept. 7, 1920.
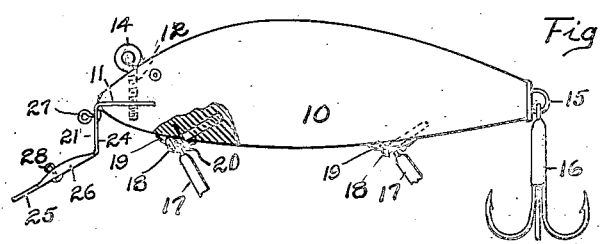
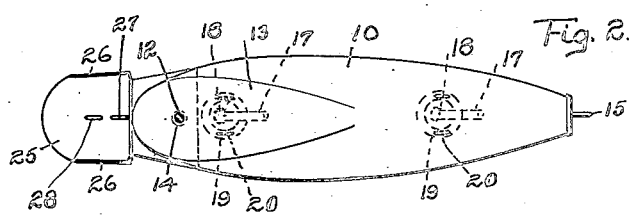
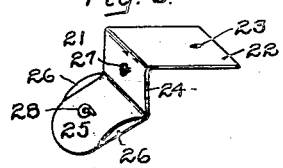
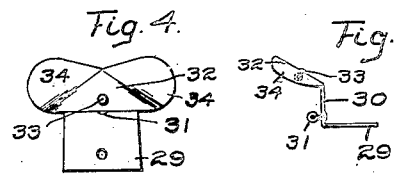
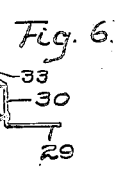
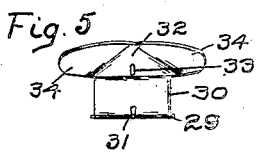
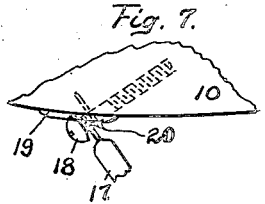
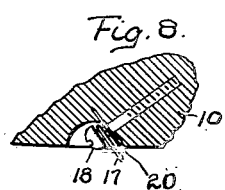
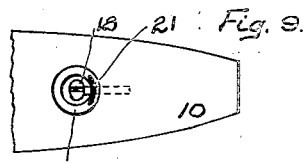
INVENTOR.
Henry S. Dills
BY Taylor & Hulse
ATTORNEYS.

UNITED STATES PATENT OFFICE.

HENRY S. DILLS, OF GARRETT, INDIANA.

FISH-BAIT.

1,352,054.  Specification of Letters Patent.  Patented Sept. 7, 1920.

Application filed December 18, 1915. Serial No. 67,533.

*To all whom it may concern:*

Be it known that I, HENRY S. DILLS, a citizen of the United States, residing at Garrett, in the county of Dekalb and State of Indiana, have invented new and useful Improvements in Fish-Baits, of which the following is a specification.

The invention relates to improvements in fish-baits.

The objects of the invention are to provide an improved casting and trolling bait which is exceedingly cheap of construction, which is conspicuous and attractive, which shall be effective in presenting the hooks to the best advantage and having means to prevent the loss of the hooks as they swing and twist on their pivots, the hooks, being easily removable also incapable of striking the body of the bait.

Another object is to provide a bait with means by which it shall be capable of several manners of use without twisting or revolving, viz.:

As a surface or top-water bait whereas it is moved straight through the water it will produce a ripple and throw a spray similarly to that produced by a minnow or animal swimming on the surface of the water.

As a surface or top-water bait where it will wriggle on the surface of the water similarly to a swimming minnow.

As a near-surface bait in which it will wabble or dart through the water similarly to a wounded minnow.

As a deep-water bait in which it will wriggle and will travel to a considerable depth in the water.

Further objects will appear in the detailed description below.

The objects of the invention are accomplished by the devices and means hereinafter described, the accompanying drawings illustrating a structure embodying the features of the invention, and in which drawings Figure 1 is a side elevational view of the bait equipped with a removable and reversible attachment for causing it to travel on the surface of the water and also deep in the water; Fig. 2 a plan view of the same the hooks being omitted; Fig. 3 a view of the attachment of Fig. 1; Fig. 4 a plan view of a modified form of attachment; Fig. 5 a front elevational view of the same; Fig. 6 a side view of the same; Fig. 7 an enlarged fractional view of the bait body illustrating the mode of attachment of the hooks; Fig. 8 a sectional and fractional view of the body illustrating a modified form of attachment of the hook and Fig. 9 a fractional bottom view of the body illustrating the hook attachment device of Fig. 7.

Referring to the drawings, 10 is the main body of the bait which is preferably made of wood and is painted in any desired color or combination of colors, but preferably to imitate a minnow. The head is provided with a slot 11 and with an aperture 12 which intersects the slot. The top 13 of the bait, for a suitable distance back from the nose, is somewhat flat, like some species of fish. A screw eye 14 is adapted to be inserted in aperture 12, and when the line is attached to the eye, the body may be used very effectively as a near-surface bait. In this use of the bait it will be found, as it is drawn through the water, to travel slightly below the surface of the water and to wabble or dart about from side to side similarly to the movements of a wounded minnow.

A screw eye or other suitable means 15 is provided at the tail of body 10 to which hooks 16 are attached and upon which the hooks may swing as a unit. In the lower side of the body I provide any number of hooks 17, Fig. 1 illustrating the use of two such hooks. Screws 18 are inserted at suitable points through the bottom of body 10 and are inclined or extend upwardly and rearwardly in the body. The bottom surface of the head of each screw is beveled upwardly to afford a slight play to the hook 17, the eye of which is loosely engaged on the shank of the screw. The outer edge or run of the head preferably rests upon body 10 when the screw is properly inserted, the head being within a washer or collar 19 which is secured to body 10 by a staple 20 which is driven through it and into body 10 at preferably a right angle to screw 18 and which tightly grips the screw and affords rigidity and strength to the hook support. The collar or washer is met by the shank of the hook as the hook swings laterally on screw 18 and it thereby limits the lateral swing of the hook so that the points of the hook will not meet body 10. The space between the head of the screw and staple 20 will in practice be only sufficient to permit the eye of the hook to freely swing on the screw so that the hook will not be capable of swinging in the direction of the length of the body, except as the beveled face of the head of the screw will permit a very slight swing in that direction. It follows that the hook will not meet the body 10 in any direction and is always held in its outwardly projecting position. It is a simple matter to remove screw 18 and place on it a new hook if the old one has been damaged.

In the modification (Fig. 8) I provide a recess in the bottom of the body, screw 18 being inserted through the rear wall of the recess in an inclined position and secured rigidly by staple 20 as in the previous form. It will be noted that in either form of support the hook is permitted to have transverse movement but not a movement in the direction of body 10 and that the points of the hooks cannot contact with the body and are always held in their outwardly projecting positions. The pull on the hooks as the bait is drawn though the water is similar to the pull of a tent rope upon its stake and the hooks will not become disengaged from body 10, yet they may be easily removed when desired.

In order that body 10 shall be capable of other movements through the water than that which it assumes when the line is attached to screw eye 14 as above described, I provide a member 21 having a section 22 provided with an aperture 23, the section being adapted to be inserted into slot 11 and fixed by screw eye 14 which passes through the aperture. Section 24 of member 21 is substantially vertical with respect to body 10 and is at the forward end of the body, and section 25 of member 20 projects forwardly at a suitable angle with section 24, the side edges of section 25 being turned up to provide a low wall 26 along each said edge for a portion of its length. Between the forward ends of the two walls the section is preferably rounded in outline. The angles between the several sections may be varied as desired as I contemplate forming the member of a more or less pliable material, such as brass or aluminum. When member 21 is attached to body 10 section 24 presents an upright wall to the water as body 10 is drawn through it. Suitable eyes or rings 27, 28 are provided in sections 24 and 25 respectively, to either of which the line may be attached. With member 21 attached to body 10 as shown by the full lines in Fig. 1, wall 24 depends in front of the bait, and with the line attached to ring 27 and drawing the body through the water, section 25 will cause the body to dive deeply down into the water while the pressure of the water upon wall 24 will cause the body to wriggle or swing back and forth similarly to the swimming movements of a minnow and the wall will also prevent all rotation of the body and twisting of the line.

When member 21 in inverted, and the line is tied to ring 27, section 25 will cause body 10 to travel along the top of the water and wall 24 will not only prevent rotation of the body but will, with section 25, produce a ripple on the surface of the water, and if the bait is drawn along rapidly the wall and section will produce a spray. The body will also have a wriggling movement as it travels along the surface of the water, when the line is attached to ring 28.

In Figs. 4, 5 and 6 a modification of the attachment is illustrated in which there is apertured section 29 adapted to be inserted in slot 11 of head 10. Upright wall 30 forms any suitable angle with section 29 and carries ring 31. Section 32 carrying ring 33 projects forwardly from section 30 at any suitable angle and is provided with laterally curved flanges or wings 34 along its opposite side edges. This attachment may be connected to body 10 with wall 30 extending upwardly or downwardly just as is the case with attachment 21. When wall 30 depends and the line is attached to ring 31, the bait will dive down into the water, at the same time wriggling like a swimming minnow and when wall 30 projects upwardly and the line is attached to ring 31, the bait travels along the surface of the water and produces a ripple or throws a spray just as in the case of attachment 21. The body will also have a wriggling movement as it travels along the surface of the water, when the line is attached to ring 33.

It is thus seen that without the use of the attachment, body 10 when drawn through the water will wabble or dart about and by the attachment it may be caused to travel along the surface of the water producing a spray or ripple, or to travel along the surface of the water with a wriggling movement or to dive deep into the water with a wriggling movement.

What I claim is:

1. In a fish-bait, the combination with the forward end of a bait body, of means having a part thereof attached to the bait body and further having an upright transversely extending wall adapted to form a resistance to the water and cause the body to wriggle or swing laterally and having a longitudinally inclined portion integral with the wall and projecting forwardly therefrom, the longitudinal axis of the inclined portion being in the vertical plane of the longitudinal axis of the body.

2. In a fish-bait, the combination with the forward end of a bait body, of means having a part thereof attached to the bait body and further having a transversely extending vertical wall and a longitudinally inclined portion projecting forwardly from the wall and integral therewith, the longitudinal axis of the inclined portion being in the vertical plane of the longitudinal axis of the body, the vertical wall being relatively wide and adapted to form a resistance to the water and to cause the body to wriggle or swing laterally and the inclined portion being adapted to control the depth to which the body shall run in the water.

3. In a fish-bait, a body having a slot in its forward end, and a member consisting of three integral sections angularly disposed with respect to each other, the middle section being substantially vertical and the other two sections projecting forwardly and rearwardly respectively from the middle section, the rearwardly projecting section being adapted to be inserted into the slot in the body and to be removably secured therein, and the forwardly projecting section being inclined longitudinally, its longitudinal axis being in the vertical plane of the longitudinal axis of the body.

In witness whereof I have hereunto subscribed my name this 7th day of December, 1915.

HENRY S. DILLS.